US008473979B2

(12) United States Patent
White et al.

(10) Patent No.: US 8,473,979 B2
(45) Date of Patent: Jun. 25, 2013

(54) SYSTEMS AND METHODS FOR GRAPHICAL ADJUSTMENT OF AN ELECTRONIC PROGRAM GUIDE

(75) Inventors: James Matthew White, Denver, CO (US); Matthew Coburn, Denver, CO (US); Luke Vanduyn, Highlands Ranch, CO (US); Karen Michelle Taxier, Highlands Ranch, CO (US); Daniel L. Rudolph, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 441 days.

(21) Appl. No.: 12/241,608

(22) Filed: Sep. 30, 2008

(65) Prior Publication Data

US 2010/0083313 A1 Apr. 1, 2010

(51) Int. Cl.
G06F 3/00 (2006.01)
G06F 13/00 (2006.01)
H04N 5/445 (2006.01)

(52) U.S. Cl.
USPC ............... 725/39; 725/44; 725/47; 725/52

(58) Field of Classification Search
USPC .................................................. 725/37–61
See application file for complete search history.

(56) References Cited

U.S. PATENT DOCUMENTS

| 4,450,477 A | 5/1984 | Lovett |
| 4,725,888 A | 2/1988 | Hakamada |
| 4,739,510 A | 4/1988 | Jeffers et al. |
| 4,852,019 A | 7/1989 | Vinberg et al. |
| 4,868,785 A | 9/1989 | Jordan et al. |
| 5,187,776 A | 2/1993 | Yanker |
| 5,260,778 A | 11/1993 | Kauffman et al. |
| 5,428,734 A | 6/1995 | Haynes et al. |
| 5,438,372 A | 8/1995 | Tsumori et al. |
| 5,450,536 A | 9/1995 | Rosenberg et al. |
| 5,453,796 A | 9/1995 | Duffield et al. |
| 5,539,478 A | 7/1996 | Bertram et al. |
| 5,539,479 A | 7/1996 | Bertram |
| 5,545,857 A | 8/1996 | Lee et al. |

(Continued)

FOREIGN PATENT DOCUMENTS

| EP | 1063797 A2 | 12/2000 |
| EP | 1158793 A2 | 11/2001 |

(Continued)

OTHER PUBLICATIONS

Wikipedia, the free encyclopedia, "Dashboard (Software)," Retrieved from the Internet on Oct. 6, 2008, http://en.wikipedia.org/w/index.php?title=Dashboard_(software)&printable=yes.

(Continued)

Primary Examiner — Scott Beliveau
Assistant Examiner — Alexander Q Huerta
(74) Attorney, Agent, or Firm — Ingrassia Fisher & Lorenz, P.C.

(57) ABSTRACT

Systems and methods provide for displaying an electronic program guide (EPG) on a display generated by a set top box (STB) or other television receiver. The electronic program guide is presented in at least a portion of the display. A resize indicator is also provided on the display so that viewer inputs corresponding to the resize indicator can be received. The size of the electronic program guide presented on the display can be adjusted in response to the viewer input corresponding to the resize indicator.

16 Claims, 4 Drawing Sheets

U.S. PATENT DOCUMENTS

| | | |
|---|---|---|
| 5,548,340 A | 8/1996 | Bertram |
| 5,559,961 A | 9/1996 | Blonder |
| 5,585,866 A | 12/1996 | Miller et al. |
| 5,589,893 A | 12/1996 | Gaughan et al. |
| 5,594,469 A | 1/1997 | Freeman et al. |
| 5,594,509 A | 1/1997 | Florin et al. |
| 5,602,597 A | 2/1997 | Bertram |
| 5,604,544 A | 2/1997 | Bertram |
| 5,606,374 A | 2/1997 | Bertram |
| 5,650,827 A | 7/1997 | Tsumori et al. |
| 5,652,630 A | 7/1997 | Bertram et al. |
| 5,659,369 A | 8/1997 | Imaiida |
| 5,677,708 A | 10/1997 | Matthews, III et al. |
| 5,682,489 A | 10/1997 | Harrow et al. |
| 5,721,815 A | 2/1998 | Ottesen et al. |
| 5,721,878 A | 2/1998 | Ottesen et al. |
| 5,742,286 A | 4/1998 | Kung et al. |
| 5,751,883 A | 5/1998 | Ottesen et al. |
| 5,754,258 A | 5/1998 | Hanaya et al. |
| 5,767,840 A | 6/1998 | Selker |
| 5,768,158 A | 6/1998 | Adler et al. |
| 5,774,186 A | 6/1998 | Brodsky et al. |
| 5,786,805 A | 7/1998 | Barry |
| 5,805,235 A | 9/1998 | Bedard |
| 5,809,265 A | 9/1998 | Blair et al. |
| 5,815,216 A | 9/1998 | Suh |
| 5,825,361 A | 10/1998 | Rubin et al. |
| 5,831,591 A | 11/1998 | Suh |
| 5,831,607 A | 11/1998 | Brooks |
| 5,867,162 A | 2/1999 | O'Leary et al. |
| 5,874,953 A | 2/1999 | Webster et al. |
| 5,898,431 A | 4/1999 | Webster et al. |
| 5,905,496 A | 5/1999 | Lau et al. |
| 5,917,488 A | 6/1999 | Anderson et al. |
| 5,917,489 A | 6/1999 | Thurlow et al. |
| 5,936,623 A | 8/1999 | Amro |
| 5,949,417 A | 9/1999 | Calder |
| 5,956,025 A | 9/1999 | Goulden et al. |
| 5,966,121 A | 10/1999 | Hubbell et al. |
| 5,978,043 A | 11/1999 | Blonstein et al. |
| 5,999,228 A | 12/1999 | Matsuura et al. |
| 6,005,565 A | 12/1999 | Legall |
| 6,008,735 A | 12/1999 | Chiloyan et al. |
| 6,008,860 A | 12/1999 | Patton et al. |
| 6,018,342 A | 1/2000 | Bristor |
| 6,020,930 A | 2/2000 | Legrand |
| 6,052,121 A | 4/2000 | Webster et al. |
| 6,057,841 A | 5/2000 | Thurlow et al. |
| 6,064,376 A * | 5/2000 | Berezowski et al. ........... 725/42 |
| 6,078,308 A | 6/2000 | Rosenberg et al. |
| 6,088,029 A | 7/2000 | Guiberson et al. |
| 6,118,442 A | 9/2000 | Tanigawa |
| 6,118,498 A | 9/2000 | Reitmeier |
| 6,125,374 A | 9/2000 | Terry et al. |
| 6,141,003 A | 10/2000 | Chor et al. |
| 6,147,714 A | 11/2000 | Terasawa et al. |
| 6,173,112 B1 | 1/2001 | Gruse et al. |
| 6,191,773 B1 | 2/2001 | Maruno et al. |
| 6,208,341 B1 | 3/2001 | van Ee et al. |
| 6,208,804 B1 | 3/2001 | Ottesen et al. |
| 6,215,417 B1 | 4/2001 | Krass et al. |
| 6,233,389 B1 | 5/2001 | Barton et al. |
| 6,266,098 B1 | 7/2001 | Cove et al. |
| 6,281,940 B1 | 8/2001 | Sciammarella |
| 6,334,217 B1 | 12/2001 | Kim |
| 6,493,036 B1 | 12/2002 | Fernandez |
| 6,498,628 B2 | 12/2002 | Iwamura |
| 6,526,577 B1 * | 2/2003 | Knudson et al. ................. 725/40 |
| 6,529,685 B2 | 3/2003 | Ottesen et al. |
| 6,556,252 B1 | 4/2003 | Kim |
| 6,650,248 B1 | 11/2003 | O'Donnell et al. |
| 6,678,009 B2 | 1/2004 | Kahn |
| 6,697,123 B2 | 2/2004 | Janevski et al. |
| 6,750,803 B2 | 6/2004 | Yates et al. |
| 6,750,887 B1 | 6/2004 | Kellerman et al. |
| 6,774,914 B1 | 8/2004 | Benayoun |
| 6,804,824 B1 | 10/2004 | Potrebic et al. |
| 6,816,442 B1 | 11/2004 | Heiman et al. |
| 6,822,698 B2 | 11/2004 | Clapper |
| 6,882,712 B1 | 4/2005 | Iggulden et al. |
| 6,934,963 B1 | 8/2005 | Reynolds et al. |
| 6,943,845 B2 | 9/2005 | Mizutome et al. |
| 7,046,161 B2 | 5/2006 | Hayes |
| 7,061,544 B1 | 6/2006 | Nonomura et al. |
| 7,148,909 B2 | 12/2006 | Yui et al. |
| 7,171,622 B2 | 1/2007 | Bhogal |
| 7,196,733 B2 | 3/2007 | Aratani et al. |
| 7,206,029 B2 | 4/2007 | Cohen-Solal |
| 7,225,456 B2 | 5/2007 | Kitsukawa et al. |
| 7,231,603 B2 | 6/2007 | Matsumoto |
| 7,268,830 B2 | 9/2007 | Lee |
| 7,370,284 B2 | 5/2008 | Andrea et al. |
| 7,420,620 B2 | 9/2008 | Habas et al. |
| 7,434,246 B2 | 10/2008 | Florence |
| 7,440,036 B2 | 10/2008 | Onomatsu et al. |
| 7,584,492 B2 | 9/2009 | Terakado et al. |
| 7,600,201 B2 | 10/2009 | Endler et al. |
| 7,620,966 B2 * | 11/2009 | Kitamori ........................ 725/43 |
| 7,636,131 B2 | 12/2009 | Hsieh et al. |
| 7,707,599 B1 | 4/2010 | Groff et al. |
| 7,746,332 B2 | 6/2010 | Le Leannec et al. |
| 7,876,382 B2 | 1/2011 | Imaizumi |
| 7,880,813 B2 | 2/2011 | Nakamura et al. |
| 8,001,566 B2 | 8/2011 | Jang |
| 8,005,826 B1 | 8/2011 | Sahami et al. |
| 8,239,784 B2 | 8/2012 | Hotelling et al. |
| 2001/0011953 A1 | 8/2001 | Shintani et al. |
| 2001/0017672 A1 | 8/2001 | Verhaeghe |
| 2002/0054062 A1 | 5/2002 | Gerba et al. |
| 2002/0057382 A1 | 5/2002 | Yui |
| 2002/0059599 A1 * | 5/2002 | Schein et al. ................... 725/39 |
| 2002/0060754 A1 | 5/2002 | Takeuchi |
| 2002/0070957 A1 | 6/2002 | Trajkovic et al. |
| 2002/0075333 A1 | 6/2002 | Dutta et al. |
| 2002/0075407 A1 | 6/2002 | Cohen-Solal |
| 2002/0097229 A1 | 7/2002 | Rose et al. |
| 2002/0122027 A1 | 9/2002 | Kim |
| 2002/0122079 A1 | 9/2002 | Kamen et al. |
| 2002/0129366 A1 * | 9/2002 | Schein et al. ................... 725/43 |
| 2002/0178446 A1 | 11/2002 | Sie et al. |
| 2002/0188948 A1 | 12/2002 | Florence |
| 2002/0191954 A1 | 12/2002 | Beach |
| 2003/0001908 A1 | 1/2003 | Cohen-solal |
| 2003/0005443 A1 | 1/2003 | Axelsson et al. |
| 2003/0005445 A1 | 1/2003 | Schein et al. |
| 2003/0018973 A1 | 1/2003 | Thompson |
| 2003/0025716 A1 | 2/2003 | Colavin |
| 2003/0066079 A1 | 4/2003 | Suga |
| 2003/0086694 A1 | 5/2003 | Davidsson |
| 2003/0115589 A1 | 6/2003 | D'Souza et al. |
| 2003/0126607 A1 | 7/2003 | Phillips et al. |
| 2003/0131356 A1 | 7/2003 | Proehl et al. |
| 2003/0191947 A1 | 10/2003 | Stubblefield et al. |
| 2003/0193426 A1 | 10/2003 | Vidal |
| 2003/0208751 A1 | 11/2003 | Kim et al. |
| 2004/0041723 A1 | 3/2004 | Shibamiya et al. |
| 2004/0070593 A1 | 4/2004 | Neely et al. |
| 2004/0107439 A1 * | 6/2004 | Hassell et al. .................. 725/44 |
| 2004/0111744 A1 | 6/2004 | Bae et al. |
| 2004/0168191 A1 | 8/2004 | Jerding et al. |
| 2004/0172651 A1 | 9/2004 | Wasilewski et al. |
| 2004/0201780 A1 | 10/2004 | Kim |
| 2004/0218905 A1 | 11/2004 | Green et al. |
| 2004/0230843 A1 | 11/2004 | Jansen |
| 2004/0255336 A1 | 12/2004 | Logan et al. |
| 2005/0002649 A1 | 1/2005 | Boyle et al. |
| 2005/0010949 A1 | 1/2005 | Ward et al. |
| 2005/0015803 A1 | 1/2005 | Macrae et al. |
| 2005/0076361 A1 * | 4/2005 | Choi et al. ...................... 725/45 |
| 2005/0084233 A1 | 4/2005 | Fujii et al. |
| 2005/0128366 A1 | 6/2005 | Cha |
| 2005/0188402 A1 | 8/2005 | de Andrade et al. |
| 2005/0190280 A1 | 9/2005 | Haas et al. |
| 2005/0251826 A1 | 11/2005 | Orr |
| 2005/0268100 A1 | 12/2005 | Gasparini et al. |
| 2006/0037047 A1 | 2/2006 | DeYonker et al. |
| 2006/0051058 A1 | 3/2006 | Rudolph et al. |

| | | | |
|---|---|---|---|
| 2006/0061688 | A1 | 3/2006 | Choi |
| 2006/0084409 | A1 | 4/2006 | Ghadiali |
| 2006/0095401 | A1 | 5/2006 | Krikorian et al. |
| 2006/0236342 | A1 | 10/2006 | Kunkel et al. |
| 2007/0019111 | A1 | 1/2007 | Won |
| 2007/0039019 | A1 | 2/2007 | Collier |
| 2007/0039020 | A1 | 2/2007 | Cansler, Jr. et al. |
| 2007/0061724 | A1 | 3/2007 | Slothouber et al. |
| 2007/0074254 | A1 | 3/2007 | Sloo |
| 2007/0079334 | A1 | 4/2007 | Silver |
| 2007/0115391 | A1 | 5/2007 | Anderson |
| 2007/0130607 | A1 | 6/2007 | Thissen et al. |
| 2007/0192791 | A1 | 8/2007 | Sullivan et al. |
| 2007/0195197 | A1 | 8/2007 | Seong et al. |
| 2007/0199022 | A1 | 8/2007 | Moshiri et al. |
| 2007/0266397 | A1 | 11/2007 | Lin |
| 2007/0277224 | A1 | 11/2007 | Osborn et al. |
| 2008/0010518 | A1 | 1/2008 | Jiang et al. |
| 2008/0024682 | A1 | 1/2008 | Chen |
| 2008/0034314 | A1 | 2/2008 | Louch et al. |
| 2008/0052245 | A1 | 2/2008 | Love |
| 2008/0066102 | A1 | 3/2008 | Abraham et al. |
| 2008/0074550 | A1 | 3/2008 | Park |
| 2008/0088495 | A1 | 4/2008 | Kawakita |
| 2008/0129886 | A1 | 6/2008 | Ishihara |
| 2008/0147803 | A1 | 6/2008 | Krzyzanowski et al. |
| 2008/0184324 | A1 | 7/2008 | Yun et al. |
| 2008/0222523 | A1 | 9/2008 | Fox et al. |
| 2008/0229254 | A1 | 9/2008 | Warner |
| 2008/0231762 | A1 | 9/2008 | Hardacker et al. |
| 2008/0235735 | A1 | 9/2008 | Wroblewski |
| 2008/0263595 | A1 | 10/2008 | Sumiyoshi et al. |
| 2009/0007209 | A1 | 1/2009 | Kawai |
| 2009/0031335 | A1 | 1/2009 | Hendricks et al. |
| 2009/0031343 | A1* | 1/2009 | Sharkey .................... 725/39 |
| 2009/0070815 | A1* | 3/2009 | Barrett et al. ............... 725/43 |
| 2009/0141024 | A1 | 6/2009 | Lee et al. |
| 2009/0241145 | A1 | 9/2009 | Sharma |
| 2010/0050199 | A1 | 2/2010 | Kennedy |
| 2010/0100909 | A1 | 4/2010 | Arsenault et al. |
| 2010/0169958 | A1 | 7/2010 | Werner et al. |

FOREIGN PATENT DOCUMENTS

| | | |
|---|---|---|
| TW | 200729167 | 1/2007 |
| WO | 0001142 | 1/2000 |
| WO | 0001142 A1 | 1/2000 |
| WO | 0178054 A1 | 10/2001 |
| WO | 0178383 A2 | 10/2001 |
| WO | 03043320 A2 | 5/2003 |
| WO | 2006119269 A2 | 11/2006 |
| WO | 2006127211 A2 | 11/2006 |
| WO | 2007015047 A2 | 2/2007 |
| WO | 2008013350 A2 | 1/2008 |

OTHER PUBLICATIONS

Nintendo, "Wii Operations Manual System Setup," 2007.
International Searching Authority, European Patent Office, "International Search Report," mailed Dec. 7, 2009; International Application No. PCT/US2009/058457, filed Sep. 25, 2009.
International Searching Authority, European Patent Office, "International Search Report and Written Opinion," mailed Dec. 18, 2009; International Application No. PCT/US2009/058456, filed Sep. 25, 2009.
International Searching Authority, European Patent Office, "International Search Report and Written Opinion," mailed Dec. 21, 2009; International Application No. PCT/US2009/058454 filed Sep. 25, 2009.
Anonymous "ZigBee," Wikipedia, the Free Encyclopedia [online], Sep. 26, 2008, XP002558439; retrieved from the Internet: <URL:http://en.wikipedia.org/w/index.php?title=ZigBee&oldid=241085798> [retrieved on Dec. 2, 2009].
International Searching Authority, European Patent Office, Annex to Form PCT/ISA/206, Communication Relating to the Results of the Partial International Search, mailed Nov. 16, 2009; International Application No. PCT/US2009/057825, filed Sep. 22, 2009.
International Searching Authority, European Patent Office, "International Search Report," mailed Feb. 4, 2010; International Application No. PCT/US2009/058937, filed Sep. 30, 2009.
International Searching Authority, European Patent Office, "International Search Report," mailed Feb. 16, 2010; International Application No. PCT/US2009/057582, filed Sep. 18, 2009.
Wightman, Robert Edward "Methods and Apparatus for Providing Multiple Channel Recall on a Television Receiver," U.S. Appl. No. 12/233,274, filed Sep. 18, 2008.
White, James Matthew et al. "Systems and Methods for Configuration of a Remote Control Device," U.S. Appl. No. 12/241,550, filed Sep. 30, 2008.
White, James Matthew et al. "Systems and Methods for Graphical control of User Interface Features Provided by a Television Receiver," U.S. Appl. No. 12/241,556, filed Sep. 30, 2008.
Vanduyn, Luke et al. "Systems and Methods for Graphical Control of Picture-In-Picture Windows," U.S. Appl. No. 12/241,571, filed Sep. 30, 2008.
White, James Matthew et al. "Systems and Methods for Providing Customer Service Features Via a Graphical User Interface in a Television Receiver," U.S. Appl. No. 12/241,580, filed Sep. 30, 2008.
Martch, Henry Gregg "Systems and Methods for Automatic Configuration of a Remote Control Device," U.S. Appl. No. 12/242,089, filed Sep. 30, 2008.
White, James Matthew et al. "Systems and Methods for Graphical Control of User Interface Features in a Television Receiver," U.S. Appl. No. 12/241,599, filed Sep. 30, 2008.
Coburn, Matthew et al. "Systems and Methods for Graphical Control of Symbol-Based Features in a Television Receiver," U.S. Appl. No. 12/241,604, filed Sep. 30, 2008.
Minnick, Danny Jean et al., "Graphical Interface Navigation Based on Image Element Proximity," U.S. Appl. No. 12/609,860 filed, Oct. 30, 2009.
Vanduyn, Luke et al. "Methods and Apparatus for Presenting Supplemental Information in an Electronic Programming Guide," U.S. Appl. No. 12/235,476, filed Sep. 22, 2008.
Vanduyn, Luke et al. "Methods and Apparatus for Providing Multiple Channel Recall on a Television Receiver," U.S. Appl. No. 12/242,587, filed Sep. 30, 2008.
Taxier, Karen Michelle et al. "Methods and Apparatus for Visually Displaying Recording Timer Information," U.S. Appl. No. 12/235,464, filed Sep. 22, 2008.
Martch, Henry Gregg et al. "Methods and Apparatus for Locating Content in an Electronic Programming Guide," U.S. Appl. No. 12/242,614, filed Oct. 17, 2008.
Taxier, Karen Michelle et al. "Apparatus and Methods for Dynamic Pictorial Image Authentication," U.S. Appl. No. 12/236,430, filed Sep. 23, 2008.
USPTO "Non-Final Office Action" mailed Nov. 24, 2010; U.S. Appl. No. 12/242,587, filed Sep. 30, 2008.
USPTO "Non-Final Office Action" mailed Jan. 12, 2011; U.S. Appl. No. 12/241,580, filed Sep. 30, 2008.
USPTO "Non-Final Office Action" mailed Jan. 28, 2011; U.S. Appl. No. 12/236,430, filed Sep. 23, 2008.
USPTO "Non-Final office Action" mailed Feb. 4, 2011; U.S. Appl. No. 12/241,599, filed Sep. 30, 2008.
USPTO "Non-Final Office Action" mailed Dec. 21, 2010; U.S. Appl. No. 12/235,476, filed Sep. 22, 2008.
USPTO "Non-Final Office Action" mailed Mar. 31, 2011; U.S. Appl. No. 12/241,556, filed Sep. 30, 2008.
USPTO "Non-Final Office Action" mailed Jul. 6, 2011; U.S. Appl. No. 12/241,571, filed Sep. 30, 2008.
USPTO "Non-Final Office Action" mailed Jul. 12, 2011; U.S. Appl. No. 12/241,604, filed Sep. 30, 2008.
USPTO "Final Office Action" mailed May 13, 2011; U.S. Appl. No. 12/235,476, filed Sep. 22, 2008.
USPTO "Final Office Action" mailed Jun. 23, 2011; U.S. Appl. No. 12/241,580, filed Sep. 30, 2008.
USPTO "Non-Final Office Action" mailed Jan. 31, 2011; U.S. Appl. No. 12/233,274, filed Sep. 18, 2008.
The International Bureau of WIPO "Notification Concerning Transmittal of International Preliminary Report on Patentability (Chapter 1 of the Patent Cooperation Treaty)," mailed Apr. 14, 2011; International Appln. No. PCT/US2009/058236, filed Sep. 24, 2009.
USPTO "Final Office Action" mailed May 13, 2011; U.S. Appl. No. 12/242,587, filed May 13, 2011.

USPTO "Non-Final Office Action" mailed Nov. 23, 2011; U.S. Appl. No. 12/242,614, filed Sep. 30, 2008.
USPTO "Final Office Action" mailed Aug. 18, 2011; U.S. Appl. No. 12/233,274, filed Sep. 18, 2008.
USPTO "Non-Final Office Action" mailed Dec. 6, 2011; U.S. Appl. No. 12/241,580, filed Sep. 30, 2008.
USPTO "Final Office Action" mailed Dec. 7, 2011; U.S. Appl. No. 12/241,599, filed Sep. 30, 2008.
USPTO "Final Office Action" mailed Oct. 21, 2011; U.S. Appl. No. 12/241,571, filed Sep. 30, 2008.
USPTO "Final Office Action" mailed Oct. 5, 2011; U.S. Appl. No. 12/241,556, filed Sep. 30, 2008.
United States Patent and Trademark Office, Final Office Action for U.S. Appl. No. 12/241,599, dated Aug. 26, 2011.
USPTO "Final Office Action" mailed Jan. 20, 2012; U.S. Appl. No. 12/241,604, filed Sep. 30, 2008.
USPTO "Non-Final Office Action" mailed Mar. 7, 2012; U.S. Appl. No. 12/235,464, filed Sep. 22, 2008.
USPTO "Non-Final Office Action" mailed Mar. 22, 2012; U.S. Appl. No. 12/241,556, filed Sep. 30, 2008.
USPTO "Final Office Action" mailed Apr. 25, 2012; U.S. Appl. No. 12/242,614, filed Sep. 30, 2008.
USPTO "Non-Final Office Action" mailed Apr. 24, 2012; U.S. Appl. No. 12/235,476, filed Sep. 22, 2008.
United States Patent and Trademark Office, Office Action for U.S. Appl. No. 12/242,587, dated Jun. 5, 2012.
USPTO "Final Office Action" mailed Aug. 8, 2012 for U.S. Appl. No. 12/241,556, filed Sep. 30, 2008.
USPTO "Non-Final Office Action" mailed Jun. 28, 2012 for U.S. Appl. No. 12/241,571, filed Sep. 30, 2008.
USPTO "Non-Final Office Action" mailed Jul. 26, 2012 for U.S. Appl. No. 12/609,860, filed Oct. 30, 2009.
USPTO "Final Office Action" mailed Aug. 2, 2012 for U.S. Appl. No. 12/241,599, filed Sep. 30, 2008.
USPTO "Final Office Action" mailed Jul. 17, 2012 for U.S. Appl. No. 12/241,580, filed Sep. 30, 2008.
USPTO "Final Office Action" mailed Aug. 9, 2012 for U.S. Appl. No. 12/235,476, filed Sep. 22, 2008.
USPTO "Final Office Action" mailed Sep. 14, 2012 for U.S. Appl. No. 12/242,587, filed Sep. 30, 2008.
USPTO "Final Office Action" mailed Oct. 9, 2012 for U.S. Appl. No. 12/235,464, filed Sep. 22, 2008.
Intellectual Property Office "Office Action" issued Oct. 25, 2012 for Taiwan Patent Appln. No. 098127906.
USPTO "Final Office Action" mailed Jan. 23, 2013 for U.S. Appl. No. 12/241,604, filed Sep. 30, 2008.
USPTO "Final Office Action" mailed Nov. 13, 2012 for U.S. Appln. No. 12/609,860, filed Oct. 30, 2009.
USPTO "Final Office Action" mailed Nov. 13, 2012 for U.S. Appl. No. 12/24,571, filed Sep. 30, 2008.
USPTO "Notice of Allowance" mailed Nov. 6, 2012 for U.S. Appl. No. 12/241,599, filed Sep. 30, 2008.
USPTO "Non-Final Office Action" mailed Dec. 5, 2012 for U.S. Appl. No. 12/24,556, filed Sep. 30, 2008.
Intellectual Property Office "Office Action" issued Oct. 30, 2012 for Taiwan Patent Appln. No. 098127902.
USPTO "Non-Final Office Action" mailed Feb. 12, 2013 for U.S. Appl. No. 12/235,476, filed Sep. 22, 2008.

* cited by examiner

SYSTEMS AND METHODS FOR GRAPHICAL ADJUSTMENT OF AN ELECTRONIC PROGRAM GUIDE

TECHNICAL FIELD

The present invention generally relates to user interfaces in television receiver devices, and more particularly relates to systems and methods for providing graphical adjustment of an electronic program guide and/or other features provided by a television receiver device.

BACKGROUND

Most television viewers now receive their television signals through a content aggregator such as a cable or satellite television provider. For subscribers to a direct broadcast satellite (DBS) service, for example, television programming is received via a broadcast that is sent via a satellite to an antenna that is generally located on the exterior of a home or other structure. Other customers receive television programming through conventional television broadcasts, or through cable, wireless or other media. Programming is typically received at a receiver such as a "set top box" (STB) or other receiver that demodulates the received signals and converts the demodulated content into a format that can be presented to the viewer on a television or other display. In addition to receiving and demodulating television programming, many television receivers are able to provide additional features. Examples of features available in many modern television receivers include electronic program guides (EPGs), digital or other personal video recorders, "place-shifting" features for streaming received content over a network or other medium, providing customer service information and/or the like.

Generally speaking, viewers interact with the STB or other receiver using some sort of user interface that receives inputs from a remote control or other input device. To change a channel, for example, the viewer typically depresses a "channel up/down" button, manually enters a number of a desired channel on a numeric keypad, and/or selects the new channel using a program guide feature of the receiver. Often, viewers seek out programs using the EPG feature provided by the receiver. The EPG generally provides comprehensive lists of programs and associated information, and allows viewers to readily tune to programs currently being shown. Many EPGs also allow viewers to set a recording for a future event, or to take other actions as appropropriate.

While conventional interfaces are useful for many purposes, there remains a continual desire for more efficient and intuitive user interfaces to the various features provided by the receiver. It is therefore desirable to create systems and methods for improving the viewer interface to the television receiver. These and other desirable features and characteristics will become apparent from the subsequent detailed description and the appended claims, taken in conjunction with the accompanying drawings and this background section.

BRIEF SUMMARY

According to various exemplary embodiments, systems and methods are provided for changing a channel or other information presented on a television or other display by a set-top box (STB) or other video receiver.

In various embodiments, the electronic program guide is presented in at least a portion of the display. A resize indicator is also provided on the display so that viewer inputs corresponding to the resize indicator can be received. The size of the electronic program guide presented on the display can be adjusted in response to the viewer input corresponding to the resize indicator.

Further embodiments provide a video receiver for presenting imagery on a display in response to viewer input signals provided from a remote control. The video receiver suitably comprises a receiver interface configured to receive an incoming modulated signal, a decoder configured to decode the incoming modulated signal to extract a video signal, and a wireless receiver configured to receive the viewer input signals from the remote control. The video receiver further comprises a processor that is configured to generate the imagery presented on the display, wherein the imagery comprises the extracted video signal. The processor is further configured to present an electronic program guide in at least a portion of the display, wherein the portion of the display comprises a resize indicator, and wherein the processor is further configured to process the viewer input signals and to adjust the size of the electronic program guide presented on the display in response to the viewer input signals corresponding to the resize indicator.

Still other embodiments provide a system for presenting television content on a display. The system suitably comprises a wireless remote control configured to provide a two-dimensional input signal in response to a user input, and a video receiver. The video receiver comprises a receiver interface configured to receive an incoming modulated signal, a decoder configured to decode the incoming modulated signal to extract television content, a wireless receiver configured to receive the two-dimensional input signal from the wireless remote control, and a processor. The processor is appropriately configured to generate the imagery presented on the display, wherein the imagery comprises the extracted video signal in a first portion of the display and an electronic program guide in a second portion of the display. The imagery further comprises a resize indicator. The processor is further configured to process the two-dimensional input signal and to adjust the size of the electronic program guide relative to the electronic program guide in response to the two-dimensional input signal corresponding to the resize indicator.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Generally speaking, the viewer is able to re-size the electronic program guide (EPG) presented on a display as desired using two-dimensional or other user interface features. The size of the EPG display may be resized and/or otherwise modified by, for example, providing any number of resize indicators and/or other features on the screen that can be "clicked" or otherwise actuated in response to two-dimensional inputs received from the viewer. By allowing for two-dimensional interaction with the program guide, the convenience of the PIP feature is greatly improved while simplifying the viewer's interaction with the display.

Although the various techniques and systems described herein may be used with any sort of remote control or command equipment, various embodiments may be particularly well suited for use with a remote control that includes a touchpad, directional pad, joystick, trackball, set of directional buttons, motion sensor and/or other feature capable of providing two-dimensional inputs to the receiver. Other embodiments, however, simply provide re-sizing without exploiting the two-dimensional control aspects described herein. Similarly, while the discussion herein focuses primarily on re-sizing electronic program guide windows, equivalent concepts could be readily applied to other features provided by the television receiver, including any sort of menu or list structures. Guide lists of programs available on a digital video recorder or place shifting device, for example, could be equivalently manipulated in the same way as the EPG displays primarily described below.

Figure 1:
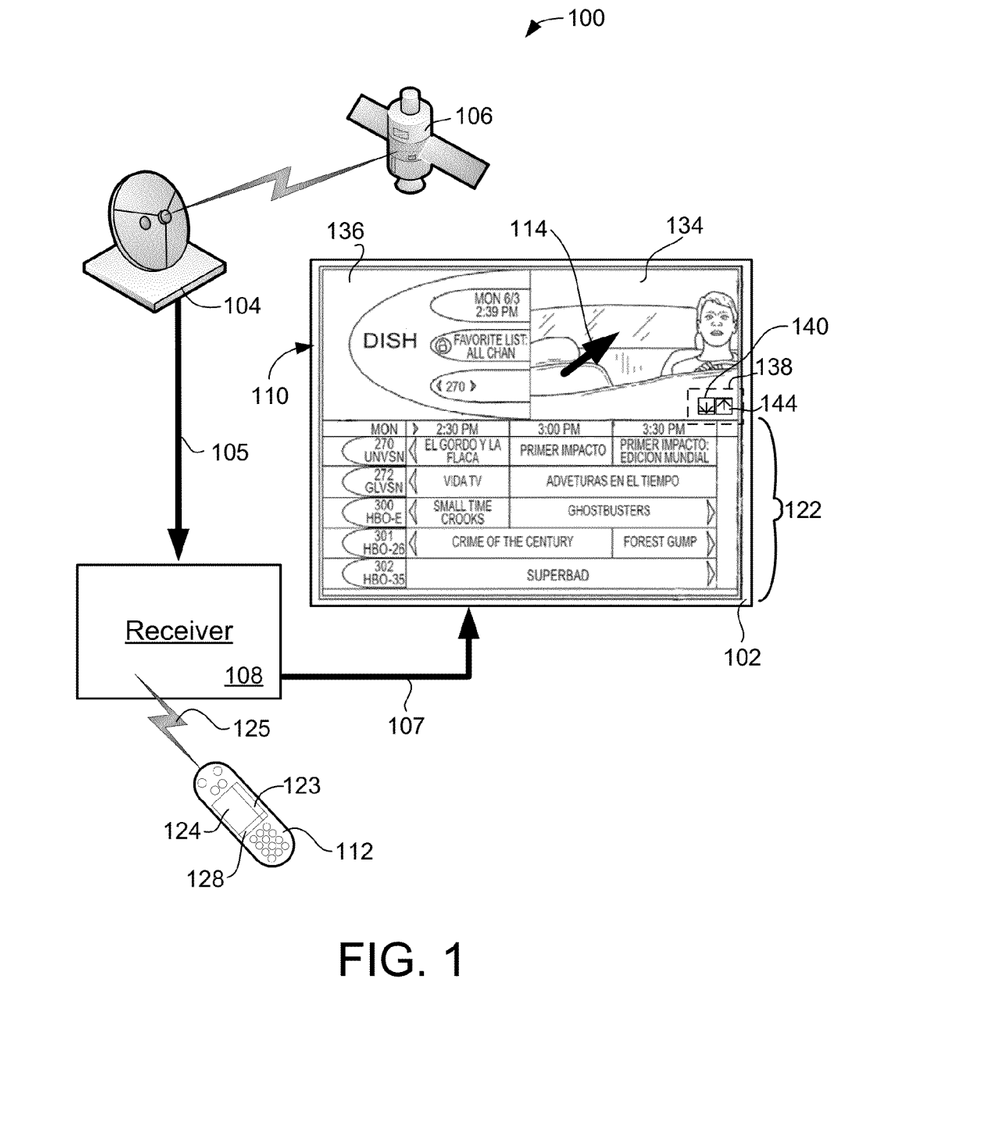
FIG. 1 is a block diagram of an exemplary television receiver system.

Turning now to the drawing figures and with initial reference to FIG. 1, an exemplary system 100 for presenting television signals to a viewer suitably includes a receiver 108 that receives signals 105 in any format and generates appropriate outputs 107 to generate imagery 110 on display 102. Typically, receiver 108 interacts with signals 125 received from a wireless remote control 112 to present television imagery 110 on display 102 as desired by the viewer. In the exemplary view shown in FIG. 1, imagery 110 includes a program guide window 122 that provides electronic program guide (EPG) information about the currently-viewed program and/or other programs as desired. The exemplary imagery 110 shown in FIG. 1 also includes decoded program information (e.g., a television program) in window 134, as well as advertising, informational and/or other information presented in window 136. The relative spacing, proportions and locations of the various windows and other features described herein are entirely exemplary, and may vary widely in other embodiments.

Television imagery is presented on display 102 as desired by the viewer. Further, two-dimensional navigation features (e.g., resize indicator 138) may be presented to allow the viewer to manipulate the size of EPG window 122 through control of a cursor 114 or other interface feature via remote control 112. In various embodiments, cursor 114 is able to move in response to two-dimensional input signals 125, which are, in turn, generated in response to inputs applied to two-dimensional input device 124. By moving cursor 114 to interact with the two-dimensional navigation features presented on display 102, EPG window 122 may be resized, moved, re-aligned or otherwise manipulated as desired.

Receiver 108 is any component, device or logic capable of receiving and decoding video signals 105. In various embodiments, receiver 108 is a set-top box (STB) or the like capable of receiving satellite, cable, broadcast and/or other signals encoding audio/visual content. Receiver 108 may further demodulate or otherwise decode the received signals 105 to extract programming that can be locally viewed on display 102 as desired. Receiver 108 may also include a content database stored on a hard disk drive, memory, or other storage medium to support a digital or other personal video recorder (DVR/PVR) feature as appropriate. Receiver 108 may also provide place shifting, electronic program guide, multi-stream viewing and/or other features as appropriate.

In the exemplary embodiment illustrated in FIG. 1, receiver 108 is shown receiving digital broadcast satellite (DBS) signals 105 from a satellite 106 at an antenna 104. Equivalent embodiments, however, could receive programming 105 from one or more programming sources, including any sort of satellite, cable or broadcast source, as well as any Internet or other network source or the like. In embodiments that include DVR functionality, programming may be stored in any sort of database as desired (e.g., in response to user/viewer programming instructions) for subsequent viewing. Content may also be received from digital versatile disks (DVDs) or other removable media in some embodiments.

Display 102 is any device capable of presenting imagery to a viewer. In various embodiments, display 102 is a conventional television set, such as any sort of television operating in accordance with any digital or analog protocols, standards or other formats. Display 102 may be a conventional NTSC or PAL television receiver, for example. In other embodiments, display 102 is a monitor or other device that may not include built-in receiver functionality, but that is nevertheless capable of presenting imagery in response to signal 107 received from receiver 108. In various embodiments, receiver 108 and display 102 may be physically combined or interconnected in any manner. A receiver card, for example, could be inserted into a slot or other interface in a conventional television, or the functionality of receiver 108 may be provided within a conventional television display 102. In other embodiments, signals 107 are transferred between receiver 108 and display 102 using any sort of cable or other interface (including a wireless interface). Examples of common interfaces include, without limitation, component video, S-video, High-Definition Multimedia Interface (HDMI), Digital Visual Interface (DVI), IEEE 1394, and/or any other formats as desired.

Remote control 112 is any sort of control device capable providing signals 125 to receiver 108 that represent inputs received from one or more viewers. Typically, remote control 112 is an infrared, radio frequency (RF) or other wireless remote that includes any number of buttons or other features for receiving viewer inputs. In an exemplary embodiment, remote control 112 communicates with receiver 108 using the IEEE 802.15.4 ("ZIGBEE") protocol, the RF for consumer electronics (e.g., "RF4CE" or "EC Net") protocols, and/or any other standard or non-standard technique for implementing wireless personal area networks (WPANs). Other embodiments may instead communicate using IEEE 802.15.1 ("BLUETOOTH"), IEEE 802.11 ("WI-FI"), conventional infrared, and/or any other wireless techniques. In some embodiments, remote control 112 may be able to support multiple types of wireless communication, such as ZIGBEE or other RF communications and also infrared communications. This feature may be useful when remote control 112 is a so-called universal remote that is able to provide input signals 125 to multiple devices.

Remote control 112 generally includes any sort of buttons, sliders, rocker switches and/or other features for receiving physical inputs from the viewer. As the user depresses or otherwise interacts with the features, remote control 112 suitably produces wireless signals 125 in response. In further embodiments, remote control 112 includes a two-dimensional input device 124 that is able to receive inputs from the user in any multi-dimensional format (e.g, "X,Y", "r,Θ", and/or the like). Examples of two-dimensional input devices 124 that could be used in various embodiments include, without limitation, touchpads, directional pads, joysticks, trackballs, sets of arrows or other buttons, and/or the like. In a typical implementation, two-dimensional input device 124 provides coordinates or other signals 125 that indicate absolute (e.g., "X,Y") and/or relative (e.g., "$\Delta X, \Delta Y$") movement in two or more dimensions. Such signals 125 may be decoded at controller 108 or elsewhere to coordinate the viewer's actions with respect to input device 124 to movement of cursor 114 or other features presented on display 102.

In the exemplary embodiment shown in FIG. 1, remote control 112 is illustrated with a touchpad-type device 124 that accepts viewer inputs applied with a finger, stylus or other object. FIG. 1 also shows touchpad device 124 as having dedicated scroll regions 123 and 128 for vertical and horizontal scrolling, respectively. Viewer movements within region 123 that are more-or-less parallel to the right edge of device 124, for example, could result in vertical scrolling, whereas movements within region 128 that are more-or-less parallel to the bottom edge of device 124 could result in horizontal scrolling. Dedicated scrolling regions 123, 128 are optional features, however, that may not be present in all embodiments. Further, scrolling could be implemented in any other manner.

In operation, then, receiver 108 suitably receives television signals 105 from a satellite, cable, broadcast or other source. In a satellite based embodiment, for example, one or more channels can be extracted from a conventional satellite feed; the video content on the selected channel can be demodulated, extracted and otherwise processed as appropriate to display the desired content to the viewer. One or more cable or broadcast channels may be similarly obtained in any manner. In some embodiments, receiver 108 may obtain multiple channel signals from different sources (e.g., one channel from a cable or satellite source and another channel from a terrestrial broadcast, DVD or other source).

Receiver 108 suitably obtains the desired content from the channel(s) indicated by the viewer, and presents the content on display 102. In various embodiments, viewers are able to further view an electronic program guide 122 that may be sized or re-sized as desired. The size of the EPG window 122 may be increased or decreased relative to other features in display 110, for example, in response to inputs 125 received from the viewer. For example, in various embodiments the viewer may be able to direct cursor 114 toward a resize indicator 138 to increase or decrease the size of window 122. In the exemplary embodiment shown in FIG. 1, resize indicator includes a first button or icon 140 that decreases the size of guide window 122 as well as a second button/icon 144 that increases the size of guide window 122. Other embodiments may contain additional features or enhancements of any sort.

Figure 2:
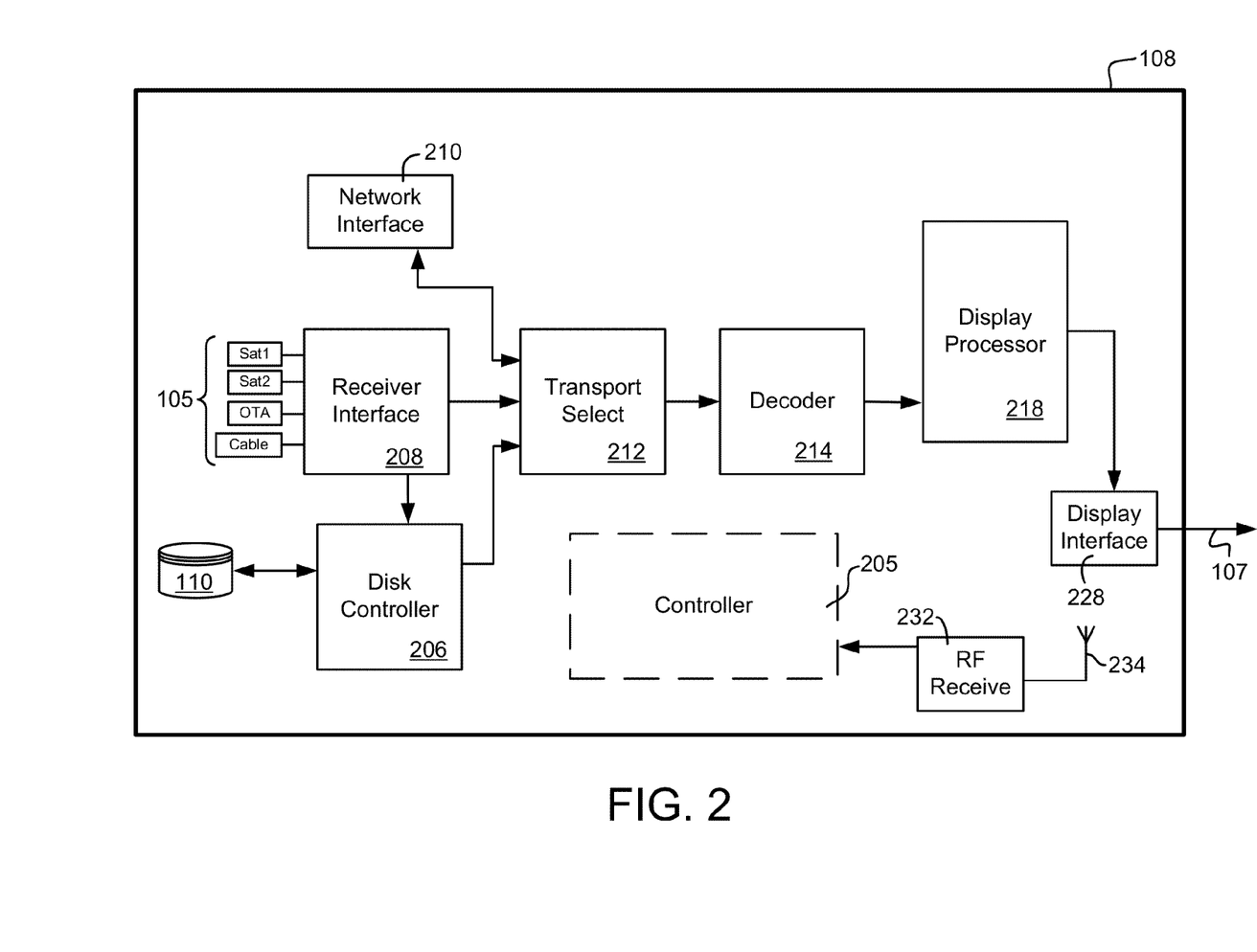
FIG. 2 is a block diagram of an exemplary television receiver device.

FIG. 2 provides additional detail about an exemplary receiver 108 that includes a receiver interface 208, a decoder 214 and a display processor 218, as appropriate. FIG. 2 also shows a disk controller interface 206 to a disk or other storage device 110, an interface 210 to a local or wide area network, a transport select module 212, a display interface 228, an RF receiver module and control logic 205. Other embodiments may incorporate additional or alternate processing modules from those shown in FIG. 2, may omit one or more modules shown in FIG. 2, and/or may differently organize the various modules in any other manner different from the exemplary arrangement shown in FIG. 2.

Receiver 108 may be physically and logically implemented in any manner. FIG. 2 shows various logical and functional features that may be present in an exemplary device; each module shown in the figure may be implemented with any sort of hardware, software, firmware and/or the like. Any of the various modules may be implemented with any sort of general or special purpose integrated circuitry, for example, such as any sort of microprocessor, microcontroller, digital signal processor, programmed array and/or the like. Any number of the modules shown in FIG. 2, for example, may be implemented as a "system on a chip" (SoC) using any suitable processing circuitry under control of any appropriate control logic 205. In various embodiments, control logic 205 executes within an integrated SoC or other processor that implements receiver interface 208, transport selector 212, decoder 214, display processor 218, disk controller 206 and/or other features, as appropriate. The Broadcom Corporation of Irvine, Calif., for example, produces several models of processors (e.g., the model BCM 7400 family of processors) that are capable of supporting SoC implementations of satellite and/or cable receiver systems, although products from any number of other suppliers could be equivalently used. In still other embodiments, various distinct chips, circuits or components may be inter-connected and inter-relate with each other to implement the receiving and decoding functions represented in FIG. 2.

Various embodiments of receiver 108 therefore include any number of appropriate modules for obtaining and processing media content as desired for the particular embodiment. Each of these modules may be implemented in any combination of hardware and/or software using logic executed within any number of semiconductor chips or other processing logic.

Various embodiments of control logic 205 can include any circuitry, components, hardware, software and/or firmware logic capable of controlling the various components of receiver 108. Various routines, methods and processes executed within receiver 108 are typically carried out under control of control logic 205, as described more fully below. Generally speaking, control logic 205 receives user input signals 125 (FIG. 1) via an RF receiver interface 232 that is able to communicate with the remote control 112 using a suitable antenna 234. Control logic receives user inputs from remote control 112 and/or any other source, and directs the other components of receiver 108 in response to the received inputs to present the desired imagery on display 102.

As noted above, receiver 108 suitably includes a receiver interface 208, which is any hardware, software, firmware and/or other logic capable of receiving media content via one or more content sources 105. In various embodiments, content sources 105 may include cable television, DBS, broadcast and/or other programming sources as appropriate. Receiver interface 208 appropriately selects a desired input source and provides the received content to an appropriate destination for further processing. In various embodiments, received programming may be provided in real-time (or near real-time) to a transport stream select module 212 or other component for immediate decoding and presentation to the user. Alternatively, receiver interface 208 may provide content received from any source to a disk or other storage medium in embodiments that provide DVR functionality. In such embodiments, receiver 108 may also include a disk controller module 206 that interacts with an internal or external hard disk, memory and/or other device that stores content in a database 110, as described above.

In the embodiment shown in FIG. 2, receiver 108 also includes an appropriate network interface 210, which operates using any implementation of protocols or other features to support communication by receiver 108 on any sort of local area, wide area, telephone and/or other network. In various embodiments, network interface 210 supports conventional LAN, WAN or other protocols (e.g., the TCP/IP or UDP/IP suite of protocols widely used on the Internet) to allow receiver 108 to communicate on the Internet or any other network as desired. Network interface 210 typically interfaces with the network using any sort of LAN adapter hardware, such as a conventional network interface card (NIC) or the like provided within receiver 108. Other embodiments may provide interfaces 210 to conventional telephone lines or other communications channels, or may omit network connectivity altogether.

Transport stream select module 212 is any hardware and/or software logic capable of selecting a desired media stream from the available sources. In the embodiment shown in FIG. 2, stream select module 212 is able to generate video signals for presentation on one or more output interfaces 228. Typically, transport select module 212 responds to viewer inputs (e.g., via control logic 205) to simply switch encoded content received from a broadcast, satellite, cable or other source 105 or from storage 110 to one or more decoder modules 214.

Receiver 108 may include any number of decoder modules 214 for decoding, decompressing and/or otherwise processing received/stored content as desired. Generally speaking, decoder module 214 decompresses, decodes and/or otherwise processes received content from stream select module 212 to extract an MPEG or other media stream encoded within the stream. The decoded content can then be processed by one or more display processor modules 218 to create a presentation on display 102 (FIG. 1) for the viewer in any appropriate format. FIG. 2 shows a single decoder module 214 operating on one television signal received from transport select module 212. In practice, any number of decoder modules 214 may be used, particularly in "picture in picture" (PIP) settings where multiple signals are simultaneously decoded and displayed. The term "decoder", then, may collectively apply to one or more decoder modules that are able to decode one or more signals for presentation on display 104.

Display processor module 218 includes any appropriate hardware, software and/or other logic to create desired screen displays via display interface 228 as desired. Such displays may include combining signals received from one or more decoder modules 214 to facilitate viewing of one or more channels. In various embodiments, display processing module 218 is also able to produce on screen displays (OSDs) for electronic program guide, setup and control, input/output facilitation and/or other features that may vary from embodiment to embodiment. Such displays are not typically contained within the received or stored broadcast stream, but are nevertheless useful to users in interacting with receiver 108 or the like. The generated displays, including received/stored content and any other displays may then be presented to one or more output interfaces 228 in any desired format. The various interface features described herein, for example, may be generated by display processor module 218 operating alone or in conjunction with control logic 205.

Display processor 218 may also generate symbology to scroll the program guide information presented in window 122 in response to viewer inputs received (and/or in response to instructions from command logic 205) to thereby make up a user interface that allows the viewer to adjust window 122 (or other features) as desired. When the viewer requests a change in the size of an EPG window 122, for example, display processor 218 may be operable to draw (or redraw) the guide at the appropriate size relative to the other screen content, and/or to provide EPG window 122 in the same imagery 110 as the decoded program signals 134. As receiver 108 receives user inputs 125 from remote control 112, control logic 205 may direct display processor 218 to adjust window 122 or any other feature of imagery 110 as directed by the viewer. Display processor 218 therefore directs the presentation of program guide window 122 in conjunction with one or more navigation features, and adjusts the program guide window 122 in response to inputs received from the viewer.

Display processor 218 produces an output signal encoded in any standard format (e.g., ITU656 format for standard definition television signals or any format for high definition television signals) that can be readily converted to standard and/or high definition television signals at interface 228. In other embodiments, the functionality of display processor 218 and interface 228 may be combined in any manner.

Figure 3:
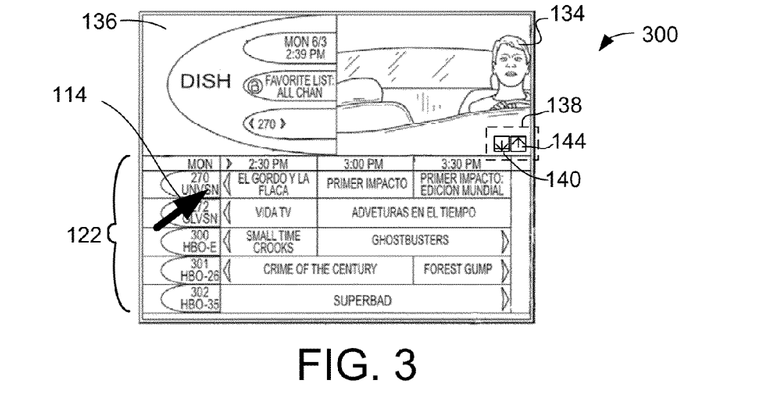
FIGS. 3-5 are diagrams of exemplary screen displays.
Figure 4:
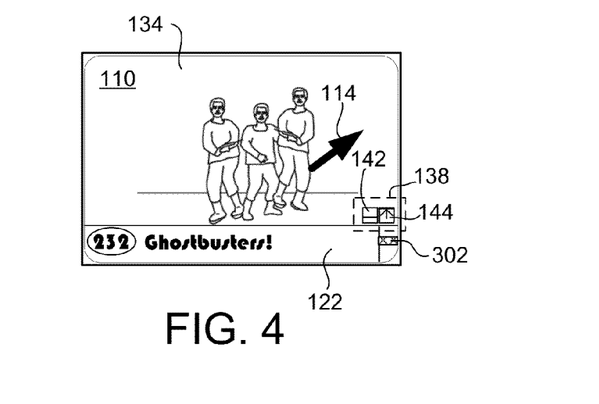
Figure 5:
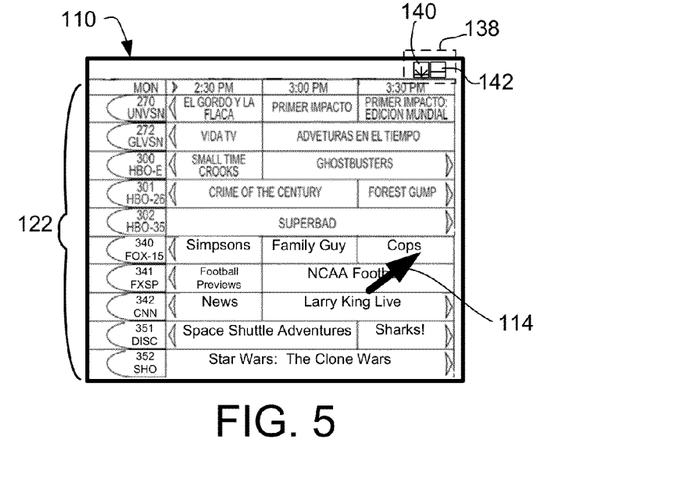

FIGS. 3-5 show an exemplary progression of displays 300, 400, 500 that would allow a viewer to change the size of program guide window 122 between a standard view 300 (FIG. 3), a smaller "browse" view 400 (FIG. 4), and a larger full-screen view 500 (FIG. 5). Other embodiments may incorporate views of different sizes and configurations, and/or may allow for manual re-sizing of display window 122 in any manner (e.g., by dragging a window size icon or other interface feature). Practical views of any EPG window 122 or other imagery 110 presented on display 102 may vary widely from those shown in FIGS. 3-5 without departing from the concepts discussed herein.

Beginning with FIG. 3, an exemplary display 300 suitably includes imagery 110 that includes program guide window 122 presented in conjunction with program imagery 134 and/or informational imagery 136 as appropriate. Program guide window 122 provides any appropriate information about programs available to the viewer. In the exemplary embodiments shown in FIGS. 1-5, program guide window 122 provides at least a channel number and the name of the program being shown on that channel. Various embodiments may alternately or additional provide network or channel identification (e.g., "Fox 15", "KSAZ", "HBO" and/or the like), program times, content descriptions, parental control ratings, and/or any other information as desired. Such information is conventionally provided to receiver 108 using any sort of electronic programming guide techniques; the information may be readily retrieved from the guide and presented on display 102 (FIG. 1) in any manner.

FIG. 3 shows a relatively conventional view of electronic program guide 122 that allows for scrolling or browsing of programs, channels, program times and other information. Viewers may be able to select certain programs or channels in various embodiments to set reminders or timers, to instruct a digital video recorder to record at a certain time, and/or to take other actions as appropriate. In some embodiments, the viewer interacts with guide 122 using a touchpad or other two-dimensional input device 124 associated with remote control 112. In such embodiments, movements with respect to the input device 124 may be mapped or otherwise processed to direct movement of cursor 114. Items may be selected using a "select" button, trigger or other feature on remote control 112 as appropriate.

As mentioned above, the viewer may be able to select different views of the electronic program guide 122 using resize indictors 138. In the exemplary view 300 shown in FIG. 3, the view 300 may be changed to a smaller view (e.g., view 400 of FIG. 4) by directing cursor 114 to icon 140 and then selecting icon 140. View 300 may be similarly changed to a larger view (e.g., view 500 of FIG. 5) by directing cursor 114 to icon 144, and then selecting icon 140 as appropriate.

FIG. 4 shows a convenient smaller view of program guide window 122 that allows for greater visibility of program content 134. Although the embodiment shown in FIG. 4 only shows a single line of program guide information, other embodiments may display multiple lines as desired across any portion of the display. The other lines shown may correspond, for example, to programs showing on other channels (e.g., channels that adjoin the currently viewed channel). In such embodiments, the currently-tuned channel may be highlighted or otherwise emphasized in any manner to allow for ready identification of the current and most relevant information.

The exemplary embodiment shown in FIG. 4 includes a scroll indicator 302 that indicates the relative position of the information presented in window 122 with respect to the available guide data. Scroll indicator 302 may move upwardly or downwardly (as presented in FIGS. 3-5) as the viewer scrolls through the information presented in program guide window 122 to further increase the awareness of the viewer. In various embodiments, the viewer is able to drag scroll indicator 302 using cursor 114 and remote control 112, as appropriate. Scroll indicator 302 may be differently shaped, positioned or otherwise implemented in any manner, or may be omitted entirely in some embodiments.

Like view 300, the exemplary browsing view 400 shown in FIG. 4 includes resize indicator 138 that allows the viewer to change the EPG view 122 to the standard view 300 or the full-screen view 500. The exemplary embodiment shown in FIG. 4 shows two icons 142 and 144 for directly selecting the standard and full-screen views, respectively, but alternate embodiments may simply provide a single icon 138 to increase the size of window 122. In some of such embodiments, the viewer may click or otherwise activate the enlarge button multiple times to select increasingly larger views of EPG window 122 as appropriate.

FIG. 5 shows an exemplary full-screen view 500 of program guide 122. In this view 500, decoded programming 134 is not displayed so that greater amounts of guide information may be presented. Like views 300 and 400 above, resize indicator 138 is provided to allow re-sizing of the view 500 as desired. In the exemplary view 500 of FIG. 5, resize indicator 138 is shown to provide icons 140 and 142 corresponding to the browsing view 400 and standard views 300 described above, respectively. In other embodiments, a single "size reduction" icon or other feature may be provided, and this feature may be actuated multiple times in some embodiments to allow for further size adjustments.

Figure 6:
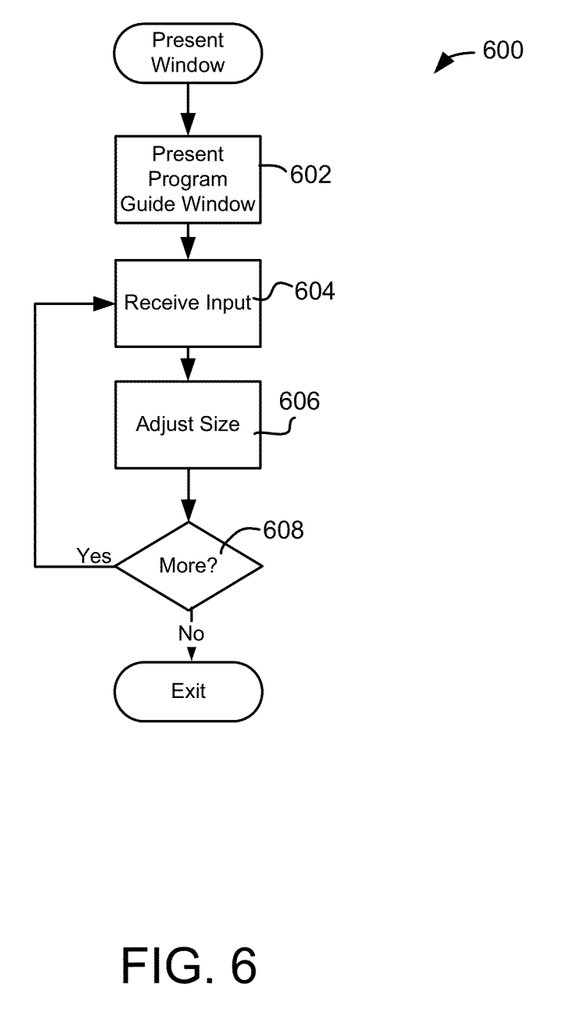
FIG. 6 is a flowchart showing an exemplary process for changing a channel with a television receiver.

FIG. 6 shows an exemplary process 600 for changing the size of an EPG window or other feature presented on a display 102. In various embodiments, the steps shown in FIG. 6 may be executed using source or object code in any format that may be stored in mass storage, firmware, memory or any other digital storage medium within receiver 104. Such code may be executed by any module or combination of modules operating within receiver 104. In an exemplary embodiment, some or all of the steps shown in process 600 are executed by a display processing module 218 (FIG. 2) operating alone or in conjunction with control logic 205 and/or the various other features shown in FIG. 2 and described above.

With reference now to FIG. 6, an exemplary process 600 suitably includes the broad steps of receiving presenting the electronic program guide 122 (step 602) along with the resize indicator, receiving two-dimensional or other inputs related to the EPG display (steps 604), processing the inputs (step 606) to adjust the size of the guide 112, and then drawing or re-drawing window 122 as appropriate. Various other steps or features may be present as well in any number of alternate embodiments.

Process 600 suitably begins by displaying the program guide 122 in any initial format (step 602). Inputs 125 that are relevant to EPG viewing may initially include any sort of indication that the viewer would like to view an EPG window 122; such an indication may be responsive to an "EPG" button on remote control 112, or to a selection of a menu feature generated on display 104, and/or the like. In various embodiments, program guide 122 may be initially displayed in any default view (e.g., "standard view" 300 shown in FIG. 3); the default view may be user-configurable in some implementations.

After PIP window 111 is displayed, subsequent inputs 125 may be received from remote control 112 that allow for moving, scrolling, item selection and/or other manipulation of the EPG 122, as described above. Received inputs 125 may therefore be processed in any manner. Control logic 205, for example, may process single and/or multi-dimensional inputs from input device 124 to extract and determine the viewer's intent for subsequent processing.

Upon receipt of subsequent inputs 125 from the viewer (step 604), the receiver 104 processes any resizing inputs as appropriate. Such inputs 125 may include, for example, two dimensional inputs received from the two-dimensional input device 124 associated with remote control 112 to allow for directional movement, resizing, and/or the like. Directional movements may allow the viewer to direct cursor 114 toward resize indicator 138, for example, and thereby graphically re-size the EPG presentation as desired. In various embodiments, the received inputs are provided from remote control 112 to receiver via RF interface 232 and antenna 234, although other techniques may be used in other embodiments.

When the proper imagery 110 is determined, program guide 122 may be drawn or re-drawn on display 102 as appropriate (step 606); re-sizing may be repeated as desired by simply providing additional viewer inputs (step 608).

In various embodiments, program guide 122 is presented in conjunction with primary imagery 110, as described above. Program guide 122 and any associated navigational features may be redrawn in response to inputs subsequently received. In practice, then, after a program guide 122 and any associated navigation features are presented on display 102 in a first iteration of step 510, subsequently received two-dimensional inputs may be further received and processed (steps 602-606) before re-drawing program guide 122 according to the newly-received inputs in a subsequent occurrence of step 510. The general logical and data flow of a practical embodiment may be modified from that shown in FIG. 6 in any manner; additional or alternate steps may be provided, and/or one or more steps may be omitted as appropriate.

Accordingly, new systems and techniques for graphically changing the size of a program guide window or other feature are described. Although the systems and features are generally described herein as applying to changing the size of a program guide window, equivalent embodiments could apply the same concepts to resizing of other windows, lists, parameters and/or the like, including selection of programs stored on a DVR, selection of programs from a network host or other source, selection of programs for placeshifting, and/or any other features as desired.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method for providing an electronic program guide for presentation on a display, the method comprising:
   providing an output in a default configuration that presents the electronic program guide in a program guide portion of the display and video programming in a video portion of the display, wherein the electronic program guide comprises information regarding a plurality of television programs on a plurality of television channels that are currently being broadcast, and wherein the video programming comprises one of the plurality of television programs for which information is available from the electronic program guide;
   providing an output that presents at least two resize indicators associated with the electronic program guide, wherein a first of the at least two resize indicators corresponds to an increase in size of the electronic program guide to a full-screen guide configuration, wherein the full-screen guide configuration presents a program guide that occupies the entire display area, and wherein a second of the at least two resize indicators corresponds to a decrease in size of the electronic program guide to a single-channel guide configuration, wherein the single-channel guide configuration presents a program guide consisting of a single television program on a single channel;
   receiving a viewer input corresponding to a selection of one of the at least two resize indicators that is graphically presented on the display; and
   in response to the viewer input corresponding to the resize indicator:
   if the first of the at least two resize indicators is selected:
   adjusting the relative sizes of the program guide portion of the display and the video portion of the display presenting the one of the plurality of television programs so that the program guide portion occupies a larger portion of the display and the video portion occupies a smaller portion of the display, and
   providing an output that presents at least two modified resize indicators, wherein a first of the at least two modified resize indicators corresponds to a decrease in size of the electronic program guide to the default configuration and wherein a second of the at least two modified resize indicators corresponds to a decrease in size of the electronic program guide to the single-channel guide configuration;
   if the second of the at least two resize indicators is selected:
   adjusting the relative sizes of the program guide portion of the display and the video portion of the display presenting the one of the plurality of television programs so that the video portion occupies a larger portion of the display and the program guide portion occupies a smaller portion of the display, and
   providing an output that presents at least two further modified resize indicators, wherein a first of the at least two further modified resize indicators corresponds to an increase in size of the electronic program guide to the default configuration and wherein a second of the at least two further modified resize indicators corresponds to an increase in size of the electronic program guide to the full-screen guide configuration.

2. The method of claim 1 wherein the adjusting comprises presenting the program guide portion of the display in a first size, a second size or a third size in response to the viewer input.

3. The method of claim 2 wherein the first size occupies less of the display than the second or the third size.

4. The method of claim 2 wherein the third size is a full-screen view.

5. The method of claim 2 wherein the video portion continues to present a television program that was presented prior to activation of the electronic program guide.

6. The method of claim 1 wherein the viewer input is a directional input received from a two-dimensional input device, and wherein the method further comprises directing a cursor on the display in response to the directional input.

7. The method of claim 6 wherein the adjusting takes place in response to a select instruction received from a remote control when the cursor is positioned over one of the at least two resize indicators on the display.

8. A video receiver for presenting imagery on a display in response to viewer input signals provided from a remote control, the receiver comprising:
   a receiver interface configured to receive an incoming modulated signal;
   a decoder configured to decode the incoming modulated signal to extract a video signal comprising television programming;
   a wireless receiver configured to receive the viewer input signals from the remote control; and
   a processor configured to generate the imagery presented on the display, wherein:
   the imagery comprises the television programming from the extracted video signal in a video portion of the display and an electronic program guide in a program guide portion of the display in a default configuration,
   the electronic program guide comprises information regarding a plurality of television programs that are currently being broadcast on a plurality of television channels,
   the television programming from the extracted video signal comprises one of the plurality of television programs for which information is available from the electronic program guide,
   the imagery further comprises at least two resize indicators,
   the processor is further configured to process the viewer input signals indicating a selection of one of the at least two resize indicators and to adjust the relative sizes of the program guide portion and the video portion of the display presenting the television programming in response to the viewer input signals corresponding to the selected one of the at least two resize indicators, wherein a first of the at least two resize indicators corresponds to an increase in size of the electronic program guide to a full-screen guide configuration, wherein the full-screen guide configuration presents a program guide that occupies the entire display area, and wherein a second of the at least two resize indicators corresponds to a decrease in size of the electronic program guide to a single-channel guide configuration, wherein the single-channel guide configuration presents a program guide consisting of a single television program on a single television channel;
   in response to the viewer input corresponding to the resize indicator:
   if a first of the at least two resize indicators is selected:
   the processor is further configured to adjust the relative sizes of the program guide portion of the display and the video portion of the display presenting the one of the plurality of television programs so that the program guide portion occupies a larger portion of the display and the video portion occupies a smaller portion of the display; and the processor is further configured to provide an output that presents at least two modified resize indicators, wherein a first of the at least two modified resize indicators corresponds to a decrease in size of the electronic program guide to the default configuration and wherein a second of the at least two modified resize indicators corresponds to a decrease in size of the electronic program guide to the single-channel guide configuration;

if a second of the at least two resize indicators is selected:

the processor is further configured to adjust the relative sizes of the program guide portion of the display and the video portion of the display presenting the one of the plurality of television programs so that the video portion occupies a larger portion of the display and the program guide portion occupies a smaller portion of the display, and the processor is further configured to provide an output that presents at least two further modified resize indicators, wherein a first of the at least two further modified resize indicators corresponds to an increase in size of the electronic program guide to the default configuration and wherein a second of the at least two further modified resize indicators corresponds to an increase in size of the electronic program guide to the full-screen guide configuration.

9. The video receiver of claim 8 wherein the receiver interface comprises a satellite interface.

10. The video receiver of claim 8 wherein the receiver interface comprises a cable interface.

11. The video receiver of claim 8 wherein the wireless receiver is configured to receive the two-dimensional input signals from a wireless remote control comprising a two-dimensional input device.

12. The video receiver of claim 8 wherein the processor is configured to display the program guide portion in any of three modes responsive to viewer input signals received with respect to the resize indicators, and wherein the program guide portion occupies only a first portion of the display during the first mode, wherein the program guide portion occupies only a second portion of the display that is larger than the first portion during the second mode, and wherein the program guide portion occupies the entire display in the third mode.

13. The video receiver of claim 12 wherein the processor is configured to display television programming from the extracted video signal in at least some of the display outside of the first portion of the display during the first mode and outside of the second portion of the display during the second mode.

14. The video receiver of claim 8 wherein the viewer input is a directional input received from a two-dimensional input device.

15. The video receiver of claim 14 wherein the processor is further configured to direct a cursor on the display in response to the directional input and to adjust the size of the program guide portion in response to a select instruction received from the remote control when the cursor is positioned over one of the at least two resize indicators on the display.

16. A method for providing an electronic program guide for presentation on a display, the method comprising:

providing an output in a default configuration that presents the electronic program guide in a program guide portion of the display and video programming in a video portion of the display, wherein the electronic program guide comprises information regarding a plurality of television programs on a plurality of television channels that are currently being broadcast, and wherein the video programming comprises one of the plurality of television programs for which information is available from the electronic program guide;

providing an output that presents at least two resize indicators associated with the electronic program guide, wherein a first of the at least two resize indicators corresponds to an increase in size of the electronic program guide to a full-screen guide configuration, wherein the full-screen guide configuration presents a program guide that occupies the entire display area, and wherein a second of the at least two resize indicators corresponds to a decrease in size of the electronic program guide to a single-channel guide configuration, wherein the single-channel guide configuration presents a program guide consisting of a single television program on a single television channel;

receiving a viewer input corresponding to a selection of one of the at least two resize indicators that is graphically presented on the display; and in response to the viewer input corresponding to the resize indicator:

if the first of the at least two resize indicators is selected:

adjusting the relative sizes of the program guide portion of the display and the video portion of the display presenting the one of the plurality of television programs so that the program guide portion occupies a larger portion of the display and the video portion occupies a smaller portion of the display, and providing an output that presents at least two modified resize indicators, wherein a first of the at least two modified resize indicators corresponds to a decrease in size of the electronic program guide to the default configuration and wherein a second of the at least two modified resize indicators corresponds to a decrease in size of the electronic program guide to the single-channel guide configuration;

if the second of the at least two resize indicators is selected:

adjusting the relative sizes of the program guide portion of the display and the video portion of the display presenting the one of the plurality of television programs so that the video portion occupies a larger portion of the display and the program guide portion occupies a smaller portion of the display, and providing an output that presents at least two further modified resize indicators, wherein a first of the at least two further modified resize indicators corresponds to an increase in size of the electronic program guide to the default configuration and wherein a second of the at least two further modified resize indicators corresponds to an increase in size of the electronic program guide to the full-screen guide configuration.

* * * * *